July 14, 1964 K. R. WEISS 3,140,899
WHEELS AND THE TRACKS AND TREAD BANDS OF WHEELS
Filed Feb. 21, 1963 3 Sheets-Sheet 2

United States Patent Office 3,140,899
Patented July 14, 1964

3,140,899
WHEELS AND THE TRACKS AND TREAD BANDS OF WHEELS
Karl Rudolph Weiss, Woking, England, assignor to National Research Development Corporation, London, England
Filed Feb. 21, 1963, Ser. No. 260,259
10 Claims. (Cl. 305—5)

This invention relates to vehicle wheels which may be used in conjunction with tracks or tread bands and more particularly to such wheels for vehicles which have to travel over both normally made up roads and across country where the ground is often relatively soft. The object of the invention is to provide means for increasing the tractive effort of the wheels as the softness of the ground traversed increases.

According to this invention a series of tiltable plates or shoes are resiliently connected together and form the perimeter of a wheel, track or tread band, the tilting movement of each shoe during its contact with the ground being controlled by its sliding movement relative to a resiliently supported guiding member. The guiding members, by reason of their resilient supports, are also slightly tiltable, and are connected together in series whereby the stress imparted to the shoes in contact with the ground is distributed over the system of resiliently supported shoes and guide members. With such an arrangement when the leading edge of a shoe forming the perimeter of a wheel engages the ground it tends to move towards the axis of the wheel and thereby it tends to slide relatively to its guiding member and tilt the shoe so that its trailing edge is relatively depressed. The extent of such depression of the trailing edge increases as the softness of the ground increases. The guiding members may be housed in shrouds or covers in which the plates or shoes may nest. Such guiding members may consist of guideways or rails formed integrally with the shrouds or covers while rollers or ball bearings may be interposed between the guideways or rails and the plate or shoes.

The invention is illustrated, by way of example only, in the accompanying drawing in which.

Figure 1:
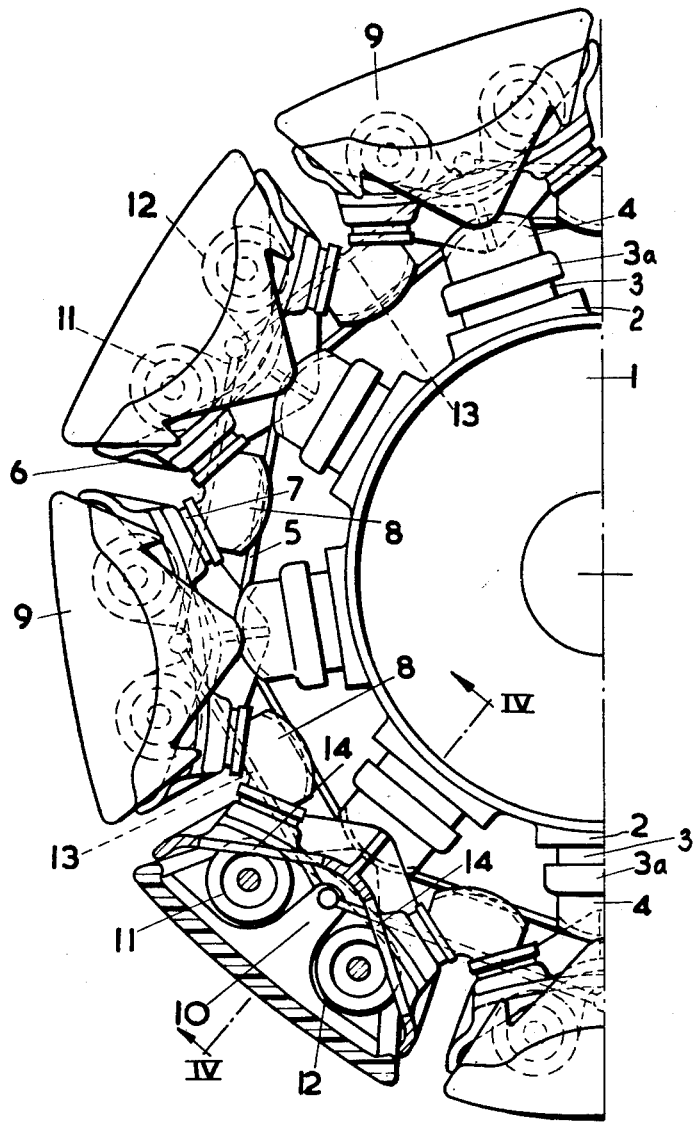
FIGURE 1 is an elevational view of half a wheel partly in section.

The form of wheel shown in FIGURE 1 comprises a spider consisting of a central disc 1 with radial arms formed by studs 2 to the outer ends of which are bonded resilient pads 3 which are also bonded to rectangular spacing members 3a provided with peripheral flanges. Such spacing members 3a carry radially extending bearing blocks 4 bonded thereto, the outer faces of the said bearing blocks being longitudinally convex. These convex outer faces are provided with one or more longitudinal grooves. Extending around the spider and engaging the grooves in the bearing blocks 4 is/are one or more rings of resilient material such as endless bands 5 of wire rope or spring steel. Beyond each radial arm of the spider is located a concave shroud 6 having its mouth directed outwardly and having exteriorly located adjacent each end thereof extensions or studs 7 directed towards thrust members 8 supported by the band or bands 5 between each pair of adjacent arms of the spider. These thrust members are formed partly or wholly of resilient material. The shrouds 6 and the thrust members 8 are so disposed that the latter abuts against the extensions or studs 7 on adjacent shrouds and is bonded thereto. Thus the shrouds and the thrust members are connected together to form a continuous ring like member that encircles the endless band or bands 5.

Nesting in each shroud 6 and projecting beyond the mouth 8 thereof is a shoe 9 provided with a web 10 disposed centrally of the shoe and extending between its leading and trailing edge, the web, being substantially tapered with its apex directed towards the axis of the wheel. Rollers 11 extending transversely of the shoes on parallel axes engage the inner arcuate surface of the shroud or guideways mounted thereon to facilitate relative movement between the shroud and the shoe. Rollers 12, co-axial with the rollers 11 but of larger diameter are also provided which engage slots (not shown) in the shrouds to guide the shoes as they are rocked in the shrouds. The shoes, are also resiliently connected together adjacent their apices by telescopic links 13 of hydraulic pneumatic or spring controlled types which extend through slots 14 in the shroud. The shoes may also be suitably connected to the shrouds to prevent their removal while permitting relative movement of the shoe in the shroud. For example, a pin (not shown) may extend transversely of a shroud between side walls thereof and pass through a slot (not shown) formed in the web 10.

Normally the leading and trailing edges of adjacent shoes are close together so that the series of shoes forms a substantially unbroken periphery to the wheel. If the wheel traverses hard ground, such as a roadway, the leading edge of each shoe, as it engages the ground, will tend to move towards the rim of the mouth of the shroud or cover but the continued advance of the wheel to bring a larger area of the shoe into contact with the hard ground will prevent such movement of the leading edge of the shoe. On the other hand, if the ground is softer, the tendency of the leading edge of a shoe to move towards the rim of the mouth of the shroud or cover will not be prevented and the resistance to such movement will lessen as the ground becomes softer. Such movement of the leading edge of the shoe will cause relative depression of the trailing edge of the shoe so that it will be forced into the ground and the inclination of the shoe to increase its tractive effort will be amplified as the ground traversed becomes softer. The stress due to the ground reaction to the shoes in contact therewith is transmitted through the shrouds or covers to the thrust member 8 which depress their associated reaches of the wire rope band towards the axis of the wheel. The stress thus imparted to the rope is, in part transmitted by the band to all the resiliently mounted studs or bearing blocks.

Various modifications may be made in the construction of the wheel shown in FIGURE 1.

Figure 2:
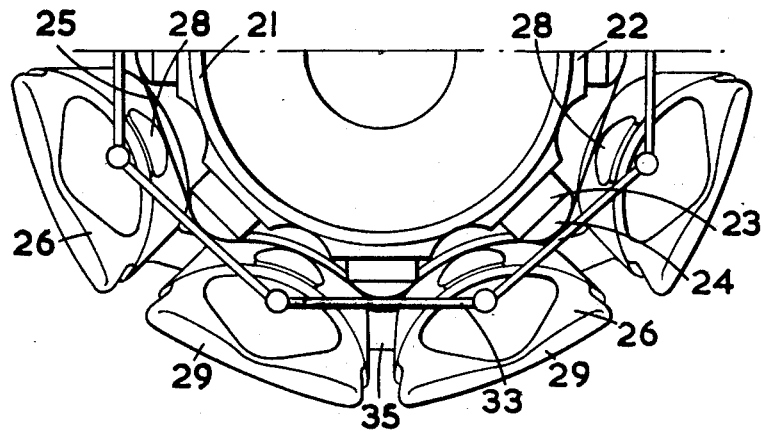
FIGURES 2 and 3 are elevational views of half wheels showing modified forms of the invention.
Figure 4:
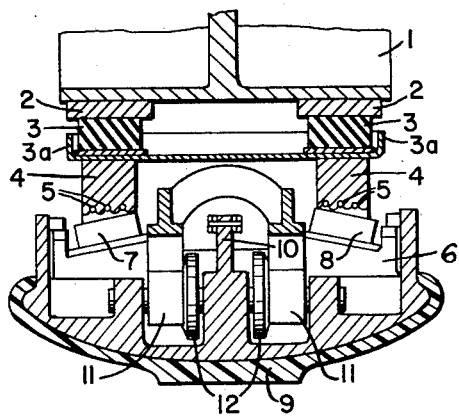
FIGURE 4 is a section on the line IV—IV, FIGURE 1.

For example, as shown in FIGURE 2, each shroud 26 has secured thereto a thrust member 28, such thrust members engaging one or more parallel endless bands 25 of resilient material which extend about bearing blocks 24 carried, through the intermediary of resilient pads 23, by studs 22 extending radially from a disc or hub 21. As with the construction of wheel shown in FIGURE 1, adjacent shoes 29 are connected by links 33, while resilient pads 35 extend between and are bonded to adjacent shrouds 26 to prevent or considerably reduce relative rocking movement between them.

Figure 3:
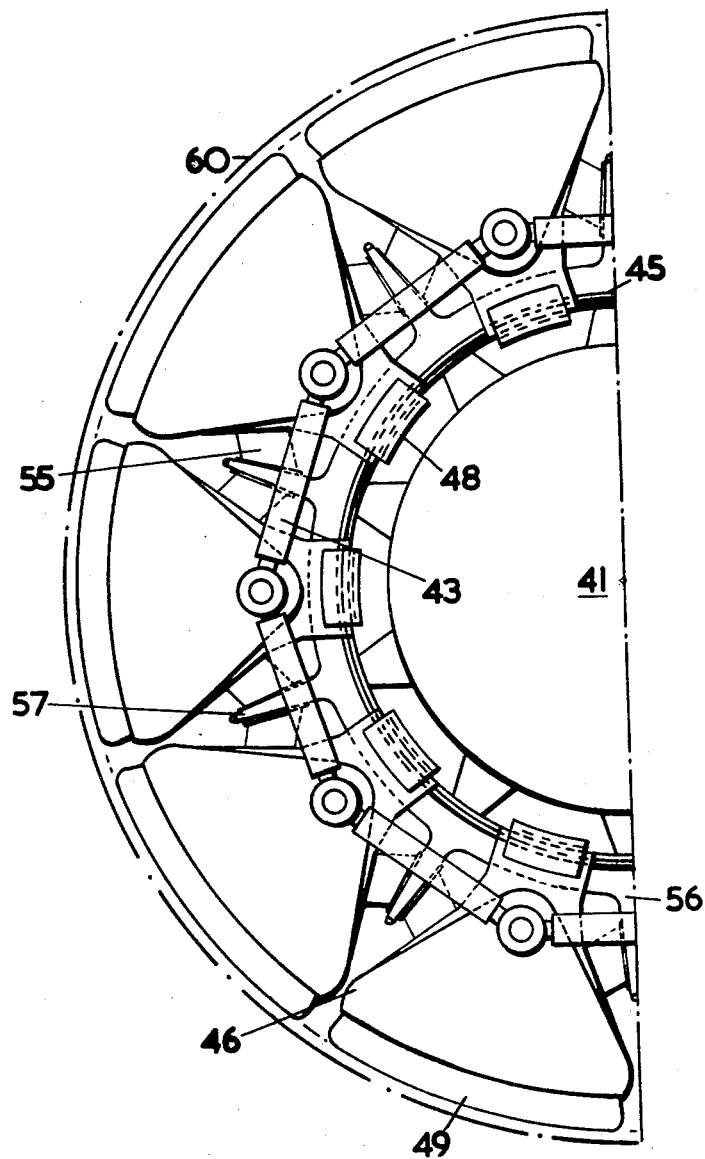

A further modification is shown in FIGURE 3 in which a ring 56 carried by a disc or hub 41 is provided with outwardly directed radial extensions 57 which project into the spaces between adjacent shrouds 46. Arranged on each side of the ring 56 is an endless resilient metal band 45 against which thrust members 48 carried by the shrouds 46 press. The radial extensions 57 have bonded to opposite face thereof resilient pads 55 which are respectively bonded to the leading and trailing edges of adjacent shrouds. Tilting of shoes 49 which are supported in the shrouds is restricted by all the shoes being connected to the shoes adjacent thereto by links 43.

With any of the forms of wheel according to this invention a resilient endless track band, as shown at 60 (FIGURE 3) may encircle the shoes.

I claim:

1. A wheel comprising a hub, at least one endless resilient band supported about said hub, shrouds supported radially about the endless resilient bands, tiltable shoes partially housed in said shrouds, radial webs extending inwardly from said shoes, and links connecting the inner part of each of said webs to the inner parts of the webs of adjacent shoes.

2. A wheel comprising a hub, at least one endless resilient band supported about said hub, shrouds supported radially about said endless resilient bands, tiltable shoes partially housed in said shrouds, longitudinal guideways in said shrouds, rollers on said shoes engaging said guideways, radial webs extending inwardly from said shoes, and links connecting the inner part of each web to the inner parts of the webs of adjacent shoes.

3. A wheel comprising a hub, at least one endless resilient band supported about said hub in spaced relation thereto, a series of concave shrouds about said endless resilient bands, thrust members engaging said endless resilient bands, resilient means connecting said thrust members and said concave shrouds, tiltable shoes partially housed in said concave shrouds and forming the periphery of the wheel, longitudinal guideways in said concave shroud, rollers on said shoes engaging said guideways, radial webs extending inwardly from said shoes, and links connecting the inner part of each web to the inner parts of webs of adjacent shoes.

4. A wheel comprising a hub, bearing blocks disposed radially about the periphery of said hub, at least one endless resilient band supported upon and about said bearing blocks, thrust member engaging said endless resilient bands, a series of shrouds about said endless resilient bands, resilient means connecting said thrust members and said shrouds, tiltable shoes partially housed in said shrouds and forming the periphery of the wheel, longitudinal guideways in said shrouds, rollers on said shoes engaging said guideways, radial webs extending inwardly from said shoes, and links connected to the inner part of each web to the inner parts of webs of adjacent shoes.

5. A wheel as claimed in claim 4, in which each thrust member engages the endless resilient bands in a reach thereof between two bearing blocks.

6. A wheel as claimed in claim 4, in which the shrouds and thrust members are resiliently connected to form a ring like member that encircles the endless resilient bands.

7. A wheel as claimed in claim 4, in which the links are telescopic.

8. A wheel as claimed in claim 4 in which a resilient endless track band encircles the shoes.

9. A wheel comprising a hub, bearing blocks disposed radially about the periphery of said hub, at least one endless resilient band supported upon and about said bearing blocks, a series of shrouds about said endless resilient bands, a thrust member carried on each shroud and engaging said endless resilient bands between adjacent bearing blocks resilient means connecting adjacent shrouds, tiltable shoes partially housed in said shrouds, longitudinal guideways in said shrouds, rollers on said shoes engaging said guideways, radial webs extending inwardly from said shoes, and links connecting the inner ends of each web to the inner ends of webs of adjacent shoes.

10. A wheel comprising a hub, at least one endless resilient band supported about said hub in spaced relationship thereto, a spider with outward radial extentions about said hub, a series of shrouds about said endless resilient bands and extending between the radial extension of said spider, thrust members carried by said shrouds and engaging the endless resilient bands, resilient pads bonded respectively to opposite sides of each radial extension of the spider and to adjacent shrouds, tiltable shoes partially housed in said shrouds, longitudinal guideways in said shrouds, rollers on said shoes engaging said guideways, and links connecting the inner parts of each web to the inner parts of webs of adjacent shoes.

References Cited in the file of this patent

UNITED STATES PATENTS

| 856,259 | Jones | June 11, 1907 |

FOREIGN PATENTS

| 323,749 | Germany | Aug. 4, 1920 |
| 459,641 | Germany | May 9, 1928 |